United States Patent [19]

Draz et al.

[11] Patent Number: 4,791,339
[45] Date of Patent: Dec. 13, 1988

[54] LIQUID CRYSTAL LIGHT VALVE WITH SPATIALLY UNIFORM LIGHT TRANSMITTANCE CHARACTERISTICS

[75] Inventors: Arthur J. Draz, Tigard; Dana E. Whitlow, Aloha; Stephen F. Blazo, Portland, all of Oreg.

[73] Assignee: Tektronix, Inc., Beaverton, Oreg.

[21] Appl. No.: 46,955

[22] Filed: May 5, 1987

[51] Int. Cl.$^4$ .................. H01J 29/52; H01J 29/56
[52] U.S. Cl. ................................. 315/386; 315/383; 315/13.11
[58] Field of Search .................. 315/13.1, 13.11, 383, 315/386; 358/168, 219, 223; 350/331 R, 351

[56] References Cited

U.S. PATENT DOCUMENTS

| | | | |
|---|---|---|---|
| 3,191,090 | 6/1965 | Vitt, Jr. et al. | 315/383 |
| 4,196,446 | 4/1980 | Rowe et al. | 315/386 |
| 4,461,983 | 7/1984 | Lees | 315/383 |

OTHER PUBLICATIONS

Haven, Duane; Electron Beam Addressed Liquid Crystal Light Valve; Proc. of the SID, vol. 24/2, 1983.
Lazarchick, Jr., "Intensity Fallout Corrector", IBM Technical Disclosure, vol. 7, No. 2, Jul. 1964, pp. 128–129.

Primary Examiner—Theodore M. Blum
Assistant Examiner—Gregory C. Issing
Attorney, Agent, or Firm—John D. Winkelman; Paul S. Angello

[57] ABSTRACT

An electrical circuit compensates for spatial variations in the light transmittance of the target surface (45) of an electron beam-addressed liquid crystal light valve (10). Such variations in light transmittance, which stem in part from the position dependent angle of incidence of the writing beam electrons and position dependent alignment layer variations arising out of manufacturing process limitations, affect the ability to achieve a monotonic gray scale luminance over the display surface. The compensating circuit adjusts the amount of beam current of the writing electron beam by varying the gain and offset voltage of the video signal, which modulates the writing beam current. This is accomplished by applying the X and Y scan position signals to a correction signal generator (102), which produces gain correction and offset correction signals whose magnitudes vary in response to instantaneous scan position of the writing electron beam on the target surface of a particular light valve. The gain correction and offset correction signals alter the character of the video signal, which is then delivered to the Z-axis driver of the writing beam-producing cathode ray tube.

2 Claims, 4 Drawing Sheets

LIQUID CRYSTAL LIGHT VALVE WITH SPATIALLY UNIFORM LIGHT TRANSMITTANCE CHARACTERISTICS

TECHNICAL FIELD

The present invention relates to electron beam addressed liquid crystal light modulators or "valves" used in display apparatus and, in particular, to such a light valve of the cathode-ray tube type having a target surface with spatially uniform light transmittance characteristics.

BACKGROUND OF THE INVENTION

An electron beam addressed liquid crystal light valve of the cathode-ray tube (CRT) type is described in copending U.S. patent application Ser. No. 07,046,822 of Buzak et al., Liquid Crystal Light Valve With Electrically Switchable Secondary Electron Collector Electrode, filed concurrently herewith. The light valve of Buzak et al. is a form of CRT having a twisted nematic liquid crystal cell, one substrate surface of which serving as a target for a writing electron beam emitted by a writing electron gun and propagating within the tube. The target substrate comprises a thin sheet of dielectric material and forms one face of the liquid crystal cell.

The CRT also includes writing and erasing electron guns and a collector electrode positioned above and over the target surface. The erasing electron gun and the collector electrode cooperate to maintain the target surface of the cell at a desired operating electrostatic potential, which is the potential of the electrons emanating from the erasing electron gun. Polarized light propagating from an external source enters the CRT through an optically transparent entry window on one side of the tube and passes through the cell and out through an exit window. The writing and erasing guns are mounted at oblique angles relative to the target substrate to keep them out of the light path. Unwritten areas of the liquid crystal cell remain in an "OFF" state that rotates by 90 degrees the polarization direction of the light emanating from the external source. Areas addressed by the writing beam are temporarily switched into an "ON" state that leaves unchanged the polarization direction of the light emanating from the external source and thereby creates a light image pattern that is detected by an analyzing polarizer positioned in the path of light exiting the CRT exit window.

The light valve of Buzak et al. is susceptible to significant spatial variations in the luminance of the written areas across the target surface. The degree of such variations differs among different ones of light valves of the same design type. It would be desirable, therefore, to incorporate in each such light valve compensation that can be individually tailored to achieve spatially uniform light transmittance over the target surface.

SUMMARY OF THE INVENTION

An object of the present invention is, therefore, to provide a liquid crystal light valve having spatially uniform light transmittance characteristics over its target surface.

Another object of this invention is to provide in such a light valve adjustable compensation that provides spatially uniform light transmittance characteristics for different light valves of the same design type.

The present invention is an electrical circuit that compensates for spatial variations in the light transmittance of the target surface by adjusting the amount of writing electron beam current in response to instantaneous scan position of the writing electron beam on the target surface. The compensating circuit provides, therefore, a light valve having substantially spatial uniform gray scale luminance over the entire display surface. It has been empirically determined that liquid crystal light valves of the same type exhibit significant spatial variations in transmittance over the target surface in part as a function of the position dependent angle of incidence of the writing beam electrons and position dependent alignment layer variations arising out of manufacturing process limitations. Such spatial variations in transmittance affect the ability to achieve a monotonic gray scale luminance, which requires a substantially uniform writing threshold level over the entire target surface.

The compensating circuit of the present invention adjusts the amount of beam current of the writing electron beam by varying the gain and offset voltage of the video signal, which modulates the writing beam current. Variation of the gain and offset of the video signal is accomplished in response to the instantaneous scan position of the electron beam on the target surface as indicated by the X and Y scan position signals developed from the time base sweep generator incorporated in the instrument of which the light valve forms a part.

The scan position information carried by the X and Y signals is applied to a correction signal generator, which produces gain correction and offset correction signals whose magnitudes vary in response to instantaneous scan position of the writing electron beam on the target surface of a particular light valve. The gain correction and offset correction signals alter the character of the video signal, which is then delivered to the Z-axis driver of the writing beam-producing CRT.

Empirical data suggest that gain correction and offset correction signals of the polynomial type derived from the X and Y scan position signals can be combined to accomplish the desired spatial uniformity in the transmittance of the target surface. The magnitudes of the variables of the polynomials of the gain correction signal and offset correction signal vary as a function of the instantaneous scan position of the writing electron beam, thereby providing necessary compensation for luminance variations in various regions of the target surface.

Additional objects and advantages of the present invention will be apparent from the following detailed description of a preferred embodiment thereof, which proceeds with reference to the accompanying drawings.

DETAILED DESCRIPTION OF THE INVENTION

Figure 1:
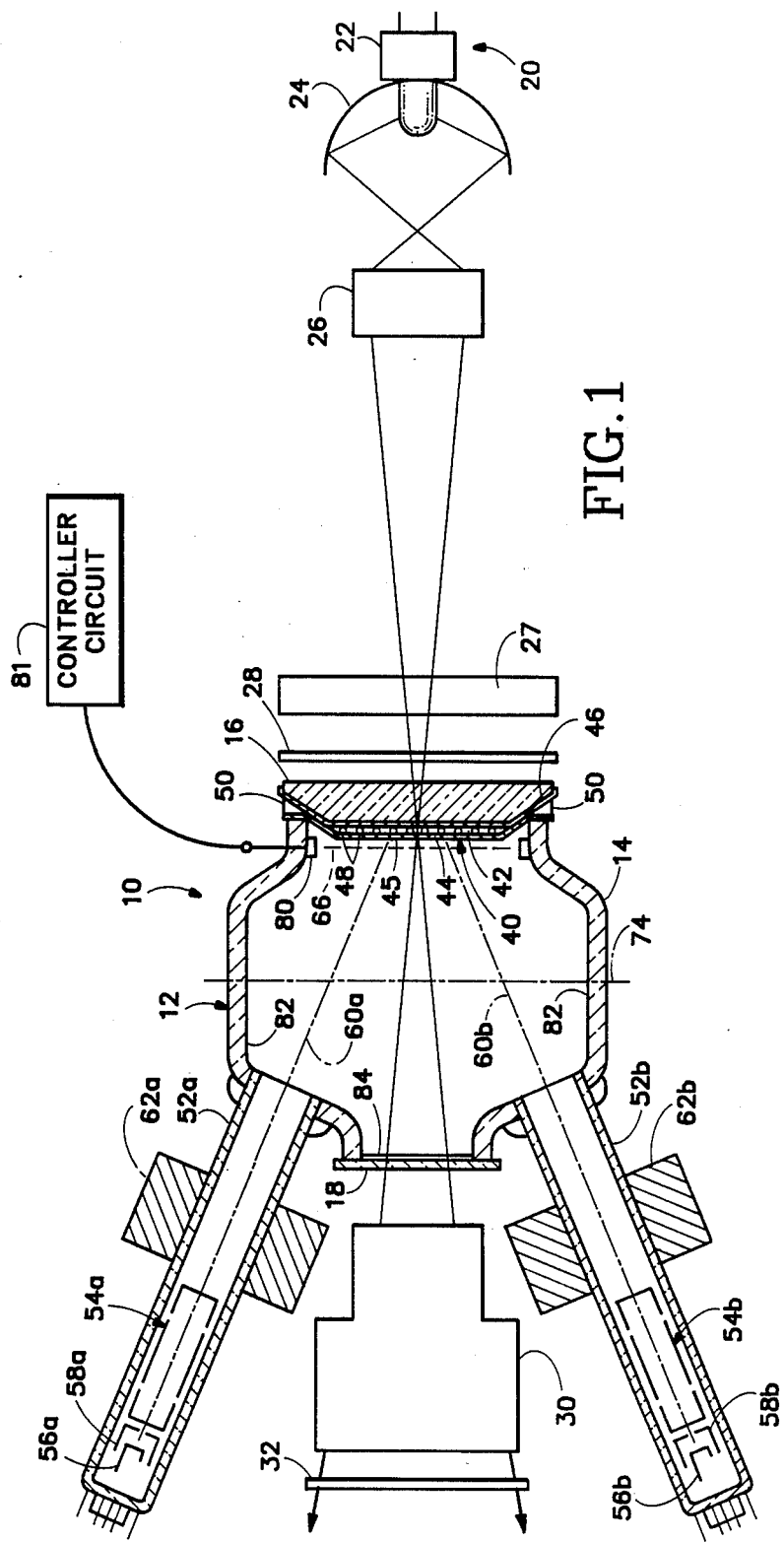
FIG. 1 is a schematic cross sectional view of an electron beam addressed liquid crystal light valve and related projection system elements provided in accordance with the present invention.

The operation of an electron beam addressed liquid crystal light valve whose target surface transmittance is made generally spatially uniform by the compensating circuit of the present invention is described herein by way of example only to the projection image display apparatus shown in FIG. 1. The illustrated apparatus includes an electron beam addressed liquid crystal light valve 10 having an evacuated envelope 12 comprising a ceramic body 14, an optically transparent entry window or faceplate 16 and an optically transparent exit window 18 mounted thereto.

Light from a suitable source 20, which in this instance comprises a projection lamp 22 and a parabolic reflector 24, is directed by an input lens system 26 and a field lens system 27 through a neutral density linear polarizing filter 28 into faceplate 16. Input lens system 26 reformats the size of the area illuminated by light source 20, and field lens system 27 steers the light in the proper direction to propagate through window 18. The light exiting faceplate 18 is projected by a projection lens system 30 through a neutral density linear polarizing filter or analyzer 32 and toward a remote viewing surface (not shown). Polarizing filter 28 and analyzer 32 are arranged so that their light transmitting axes are aligned parallel to each other. Skilled persons would appreciate that light valve 10 can be configured to operate with orthogonally aligned axes of polarizing filter 28 and analyzer 32.

Light valve 10 has an internal liquid crystal cell 40 (enlarged in FIG. 1 for clarity) which is disposed in the path of the polarized projection light entering envelope 12 through faceplate 16. Cell 40 comprises a layer 42 of a nematic liquid crystal material captured between faceplate 16 and a thin, optically transparent target substrate 44 having a target surface 45. Target substrate 44 is formed of a suitable dielectric material such as glass, a polyimide, or mica, the last-mentioned of which being preferred. The mica can be coated with a layer of magnesium oxide (MgO) as described in copending U.S. patent application Ser. No. 07/046,807 of Haven, et al., Electron Beam—Addressed Liquid Crystal Cell, filed concurrently herewith. The MgO coating provides a relatively high secondary electron emission ratio. The edges of the faceplate 16 and substrate 44 are sealed to the body 14 with ceramic frit seals 50 or other suitable material. Preferably the cell is assembled with the target substrate stretched over spacers 48 in the manner described in copending U.S. patent application Ser. No. 07/046,826 of Chitwood et al., Liquid Crystal Cell and Method of Assembly of Same, filed concurrently herewith. The resulting tension stresses in the target substrate secure the substrate in place so that the cell will maintain a uniform thickness.

An optically transparent conductive film 46 of indium tin oxide (ITO) covering the inner surface of faceplate 16 serves as a backplate electrode for the cell. A DC voltage is applied to conductive film 46 to make it greatly more positive than the voltage of the writing electron gun, as will be described below. Target substrate 44 is maintained at a predetermined distance from film 46 by a plurality of spacers 48 of substantially uniform height. Preferably, numerous small spacers (glass beads or photolithographically fabricated spacers, for example) are distributed fairly uniformly throughout the space between faceplate 16 and target substrate 44.

The confronting surfaces of target substrate 44 and ITO film 46 are treated to provide a homogeneous (i.e., parallel) surface alignment of the nematic material captured between them. The alignment directions of the two surfaces are arranged at right angles to provide a 90-degree twist cell. The desired surface orientation is provided in a known manner, such as by vacuum-depositing silicon monoxide (SiO) onto the surfaces at an angle of about five degrees.

Nematic liquid crystal materials suitable for use in cell 40 include a nematic liquid crystal material commercially available from E. Merck as ZLI 2244. Ideally, the nematic liquid crystal material should have a low dielectric constant and low viscosity at room temperature. Materials having such characteristics are preferable because they minimize the writing beam current required to switch the cell at speeds necessary to provide standard monochrome television image displays.

The molecules of the nematic liquid crystal material in layer 42 are ordered such that the polarization direction of plane polarized light passing through the cell is rotated 90 degrees in the absence of an applied electric field (i.e., in the "OFF" state). Whenever a potential difference is applied across any given region of the liquid crystal material, the longitudinal axes of the liquid crystal molecules in that region tend to orient themselves in a direction parallel to the resulting field, thereby decreasing the amount of rotation of the polarization direction of the light passing through that region of the cell 40. If the potential difference across cell 40 is of sufficient magnitude (i.e., in the "ON" state), the polarization direction of the light passing through that region of the cell is substantially unchanged. Since the light-transmitting axes of both polarizing filter 28 and analyzer 32 are aligned in the same direction, light passes through and is blocked by analyzer 32 whenever the light propagates from regions of cell 40 that are in the "ON" state and the "OFF" state, respectively.

Envelope 12 further comprises first and second similar elongate tubular glass necks 52a and 52b, one end of each neck being frit sealed to body 14 adjacent window 18. A writing electron emitting means or gun 54a is mounted within neck 52a. Gun 54a includes a cathode 56a, a control grid 58a, and associated electrodes for forming a narrow electron beam 60a that is directed at an oblique angle relative to and toward target substrate 44 of liquid crystal cell 40. Conductive film 46 is held at a very large positive potential relative to the potential applied to cathode 56a of gun 54a and, therefore, contributes to the acceleration potential of writing beam 60a. Video or other input signals are applied to grid 58a to modulate the beam current of electron beam 60a in accordance with the video image to be projected onto the remote viewing surface.

Writing gun 54a is operated so that the electrons in beam 60a strike target surface 45 with an energy $E_B$, which causes the emission of secondary electrons with a secondary electron ratio $\delta$ greater than 1. (The secondary electron emission ratio is defined as the number of secondary electrons emitted by target substrate 44 for each incident electron striking target substrate 44.) The number of secondary electrons generated by writing beam 60a is, therefore, greater than the number of writing electrons that strike target surface 45.

Secondary electron collector electrode 66 can be of the grid type or mesh type and is positioned over and in substantially parallel, spaced apart relation to target surface 45. Collector electrode 66 is spaced apart from target surface 45 by a distance of about 2.54 millimeters. Collector electrode 66 comprises, for example, a grid formed by attaching parallel wire segments of about five microns in diameter to a frame. Writing beam 60a is directed through collector electrode 66 and toward target surface 45.

Whenever writing beam 60a is raster scanned over target surface 45 during a first time interval, a collector electrode controller circuit 81 applies to collector electrode 66 a potential of about +300 volts relative to the potential on conductive film 46. Collector electrode 66 collects, therefore, the secondary electrons emitted from target surface 45. Since the secondary electron emission ratio for writing beam 60a is greater than one and the secondary electrons are collected by collector electrode 66, the areas of target surface 45 written or addressed by writing beam 60a have a positive electrostatic potential.

An erasing electron emitting means or gun 54b is mounted within neck 52b. Gun 54b includes a cathode 56b, a control grid 58b, and associated electrodes for forming a narrow electron beam 60b that is directed at an oblique angle relative to and toward target substrate 44 of liquid crystal cell 40. After a complete raster scan of target surface 45 by writing beam 60a, erasing beam 60b is raster scanned across target surface 45 in response to suitable electrical signals supplied by deflection circuitry (not shown) to an electromagnetic deflection yoke 62b supported on neck 52b, thereby to complete a video image field. Erasing gun 54b is operated in a manner similar to that of writing gun 54a. The electrons in beam 60b strike target surface 45 with the energy $E_B$. There is no modulation of the beam current of erasing beam 60b during the raster scan of target surface 45.

Whenever erasing beam 60b is raster scanned across target surface 45 during a second time interval, collector electrode controller circuit 81 applies to collector electrode 66 a potential of about zero volts relative to the potential on film 46. Such a potential on collector electrode 66 causes the secondary electrons to redeposit primarily on target surface 45 and thereby erase the image that had previously been addressed by writing beam 60a. The effect of collector electrode 66 is to stabilize at zero volts the electrostatic potential at any point on target surface 45 relative to the potential on film 46. This would be true for any energy value of erasing beam 60b for which the secondary electron emission ratio is greater than 1. The image can, of course, be maintained by rewriting it at a suitable refresh rate.

A conductive coating 82 on the interior surface of ceramic body 14 is electrically connected to a conductive film 84 of ITO on the inner surface of window 18. Coating 82 and film 84 are connected to a potential of about 100 volts more positive than the maximum potential (i.e., +300 volts relative to conductive film 46) of collector electrode 66 and prevent the inner surfaces of respective body 14 and window 18 from accumulating electrical charge during the operation of light valve 10.

Figure 2:
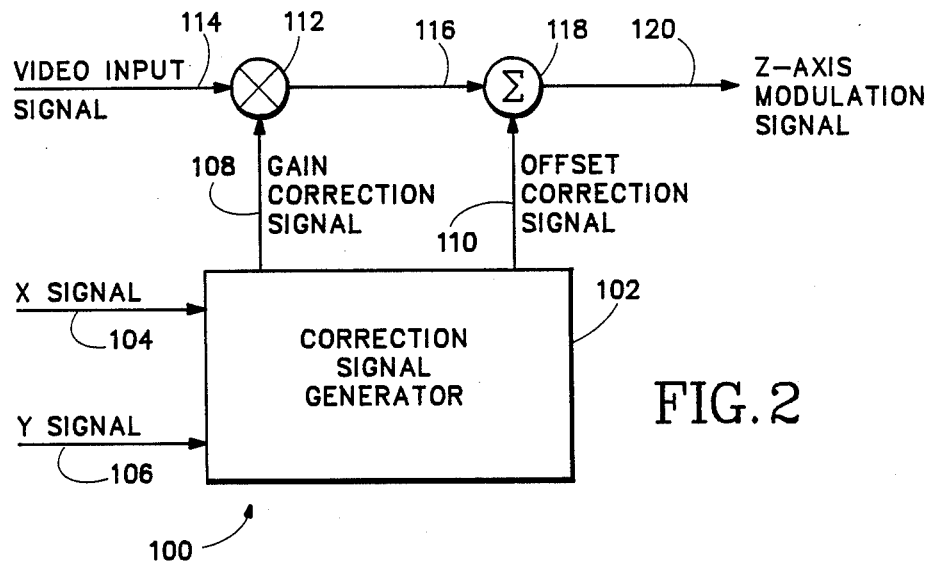
FIG. 2 is a simplified block diagram of the compensating circuit of the present invention.

With reference to FIG. 2, compensating circuit 100 comprises a correction signal generator 102 that receives on its input conductors 104 and 106 the respective X scan position signal (X signal) and Y scan position signal (Y signal) developed by the horizontal sweep generator (not shown). The X and Y signals are phase-locked bipolar continuous-wave voltage waveforms of the sawtooth type, the X signal oscillating at 32 KHz and the Y signal oscillating at 60 Hz. The present invention can be practiced at different operating frequencies for the X and Y signals.

Correction signal generator 102 generates polynomial correction signals whose magnitudes change as functions of the X and Y signals. The polynomial correction signals include a gain correction signal and an offset correction signal that appear on the respective output conductors 108 and 110 of correction signal generator 102. The magnitudes of the gain correction signal and the offset correction signal vary, therefore, as a function of the scan position of the writing electron beam as it moves across the target surface.

An analog multiplier circuit 112 receives the video signal on an input conductor 114 and the gain correction signal on output conductor 108 and provides on an output conductor 116 a signal representing the product of the video input signal and gain correction signal. A summing module 118 sums the product signal on conductor 116 and the offset correction signal 118 to produce on an output conductor 120 a Z-axis modulation signal which is delivered to a drive circuit (not shown) to modulate the writing electron beam. In the preferred embodiment, output conductors 110 and 116 are electrically connected to cathode 56a and grid 58a, respectively, of writing electron gun 54a, which functions as the summing module 118. Correction signal generator 102 synthesizes the gain correction signal and the offset correction signal from the X and Y signals by means of the electrical circuit shown in FIG. 3.

Figure 3A:
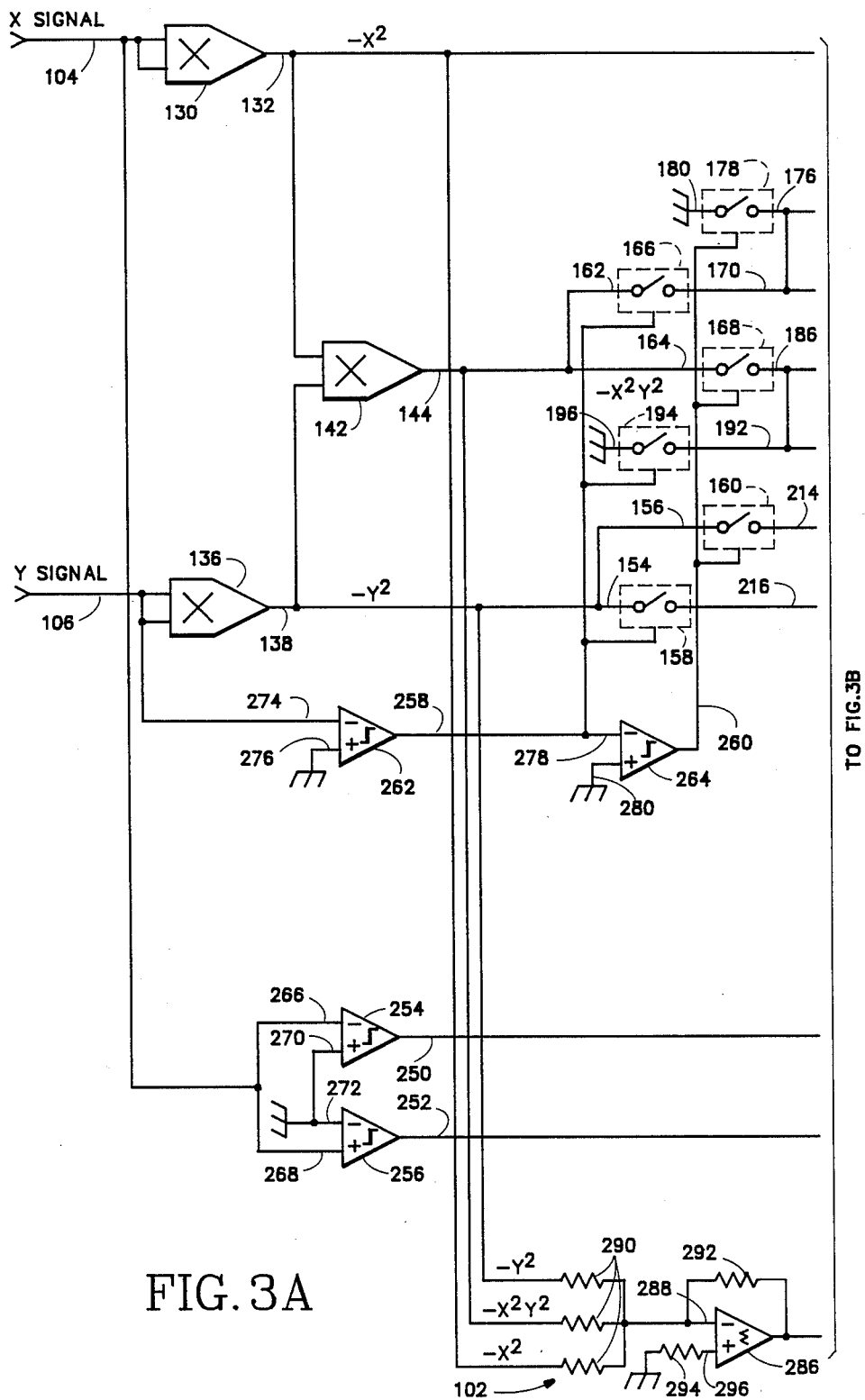
FIG. 3 is a diagram of the compensating circuit that develops gain correction and offset correction signals for the video signal in accordance with the present invention.
Figure 3B:
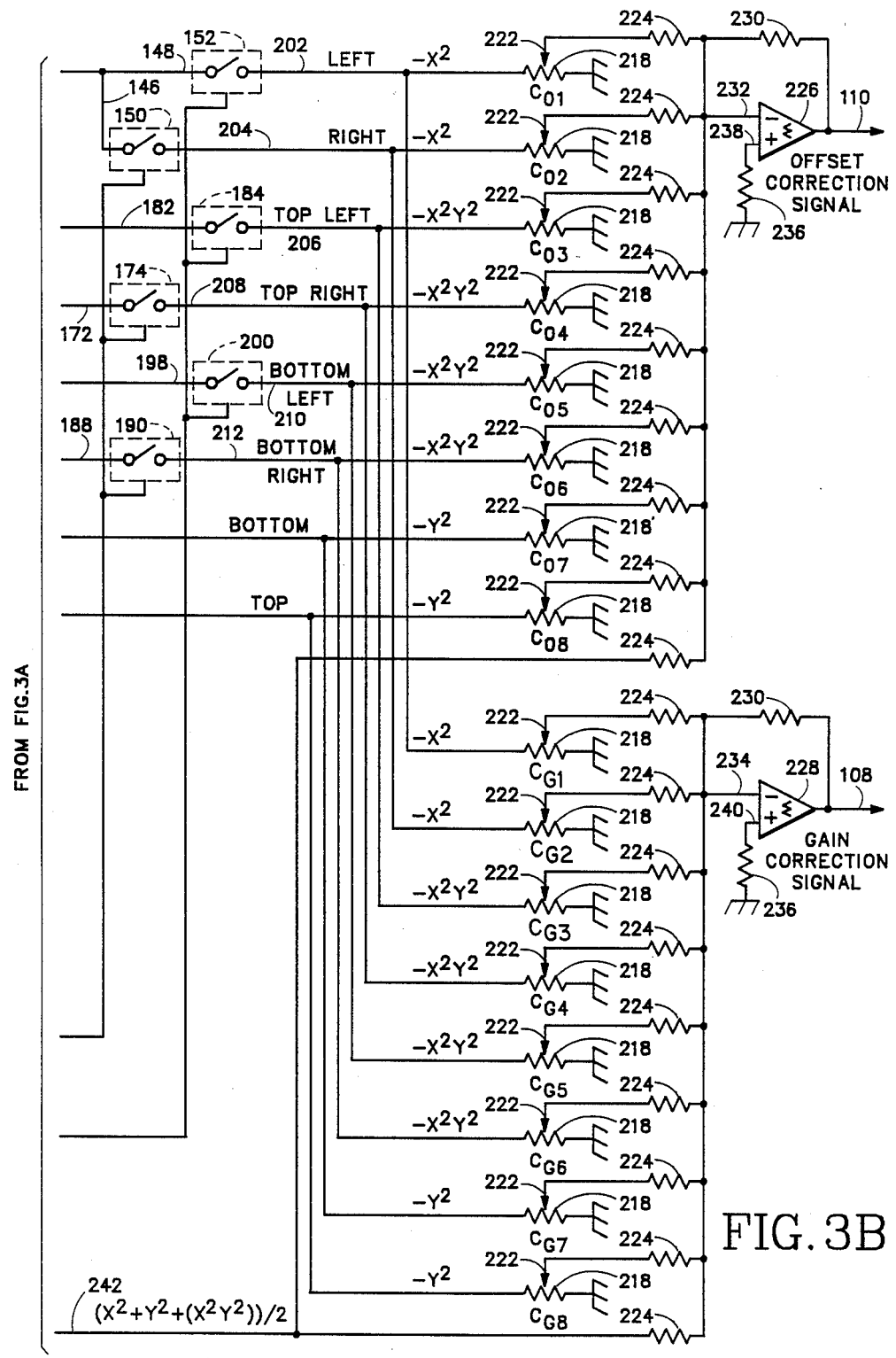

With reference to FIG. 3, the X signal appearing on input conductor 104 is delivered to an analog multiplier 130 whose inputs are electrically connected together to produce on a conductor 132 an output signal representing $-X^2$. The Y signal appearing on input conductor 106 is delivered to an analog multiplier 136 whose inputs are electrically connected together to produce on a conductor 138 an output signal representing $-Y^2$. The $-X^2$ and $-Y^2$ signals appearing on the respective conductors 132 and 138 are applied to the inputs of an analog multiplier 142, which produces on a conductor 144 an output signal representing the quantity $-X^2Y^2$. The magnitudes of the $-X^2$, $-Y^2$, and $-X^2Y^2$ signals are scaled, and such scaled signals are selectively combined as a function of the instantaneous scan position of the writing electron beam to compensate for spatial variations in the luminance of target surface 45. These signals constitute the variables of the polynomials that represent the gain correction signal and offset correction signal, which are synthesized in the following manner.

The $-X^2$, $-Y^2$, and $-X^2Y^2$ signals are delivered to the signal inputs of a group of field effect transistor (FET) switches. The FET switches receive on their control inputs one of the X and Y signals that selectively provide conduction paths for the $-X^2$, $-Y^2$, and $-X^2Y^2$ signals, whose magnitudes are scaled by potentiometers and which are applied to the inputs of summing amplifiers to vary the magnitudes of the offset and gain signals as a function of the instantaneous scan position of the writing electron beam. In particular, the $-X^2$ signal appearing on conductor 132 is applied to the signal inputs 146 and 148 of the respective FET switches 150 and 152, and the $-Y^2$ signal appearing on conductor 138 is applied to the signal inputs 154 and 156 of the respective FET switches 158 and 160.

The $-X^2Y^2$ signal is applied to the signal inputs 162 and 164 of the respective FET switches 166 and 168. The output 170 of FET switch 166 is connected to the signal input 172 of a FET switch 174 and the output 176 of a FET switch 178, whose signal input 180 is connected to ground. The output 176 of FET switch 178 is also connected to the signal input 182 of a FET switch 184. The output 186 of FET switch 168 is connected to the signal input 188 of a FET switch 190 and the output 192 of a FET switch 194, whose signal input 196 is connected to ground. The output 186 of FET switch 168 is also connected to the signal input 198 of a FET switch 200.

The outputs 202, 204, 206, 208, 210, 212, 214, and 216 of the respective FET switches 152, 150, 184, 174, 200, 190, 160, and 158 are applied to an end terminal of a different one of eight 20 kilohm potentiometers 218. The other end terminal of each of the potentiometers 218 is connected to ground. Each one of the wiper terminals 222 of potentiometers 218 is connected to a 33 kilohm resistor 224 which constitutes one input of a nine-input summing amplifier 226, whose output 110 represents the offset correction signal, and one input of a nine-input summing amplifier 228, whose output 108 represents the gain correcion signal. A pair of 68 kilohm feedback resistors 230 positioned between output 110 and inverting input 232 of amplifier 226 and between output 108 and inverting input 234 of amplifier 228 set the overall gain of the respective amplifiers. Changing the position of the wiper terminal 222 of any one of potentiometers 218 changes the effective gain of the amplifier with respect to the signal applied to that potentiometer and thereby changes the magnitude of the signal. Such signal constitutes a variable of the polynominal characterizing the offset correction signal or gain correction signal. A pair of 3.3 kilohm resistors 236 are connected between ground and the noninverting inputs 238 and 240 of the respective amplifiers 226 and 228 to minimize the effects of the input offset currents.

The signal on conductor 242 constitutes the remaining input of summing amplifiers 226 and 228. This signal provides an independent bipolar gain correction capability for each of the other inputs of the nine-input summing amplifiers 226 and 228 and is derived in the manner described below.

Predetermined ones of the twelve FET switches are actuated at different times as a function of the instantaneous scan position of the writing electron beam to provide different combinations of the $-X^2$, $-Y^2$, and $-X^2Y^2$ signals, whose magnitudes are scaled by the positions of the wiper terminals 222 of their respective potentiometers 218. These different combinations provide independent offset and gain adjustments to the video signal, which modulates the intensity of the writing electron beam, for each one of eight regions of target surface 45. This is accomplished by deriving signals indicative of the polarity of the X and Y signals and applying the appropriate ones of such signals to the control signal inputs of the FET switches to provide conduction paths for the $-X^2$, $-Y^2$, and $-X^2Y^2$ signals to the appropriate scaling potentiometers 218. The appropriate combinations of scaled variables of the polynomials representing the offset correction signal and gain correction signal are, therefore, introduced into the video signal as the writing electron beam traverses the region of target surface 45 to which such combinations correspond.

The signals indicative of the polarity of the X signal are developed on the outputs 250 and 252 of the respective voltage comparators 254 and 256, and the signals indicative of the polarity of the Y signal are developed on the outputs 258 and 260 of the respective voltage comparators 262 and 264. The X signal on conductor 104 is applied to the inverting input 266 of comparator 254 and the noninverting input 268 of comparator 256. The noninverting input 270 of comparator 254 and the inverting input 272 of comparator 256 are connected to ground. Whenever the X signal is greater than zero volts, a positive voltage develops on output 250 of comparator 254 and a negative voltage develops on output 252 of comparator 256. Whenever the X signal is less than zero volts, a negative voltage develops on output 250 of comparator 254 and a positive voltage develops on output 252 of comparator 256.

The Y signal on conductor 106 is applied to the inverting input 274 of comparator 262, whose noninverting input 276 is connected to ground. The output 258 of comparator 262 is applied to the inverting input 278 of comparator 264, whose noninverting input 280 is connected to ground. Whenever the Y signal is greater than zero volts, a negative voltage develops on output 258 of comparator 262 and a positive voltage develops on output 260 of comparator 264. Whenever the Y signal is less than zero volts, a positive voltage develops on output 258 of comparator 262 and a negative voltage develops on output 260 of comparator 264. The inputs of comparators 254 and 256 are connected in parallel so that the voltage transitions at their outputs occur simultaneously. Comparators 262 and 264 switch at a relatively slow rate so that parallel connection of their inputs is not required.

The outputs 250, 252, 258, and 260 of the respective comparators 254, 256, 262, and 264 are applied to certain ones of the control signal inputs of the FET switches, each one of which provides a conduction path for the signal applied to its signal input whenever its control signal input receives a positive voltage.

Figure 4:
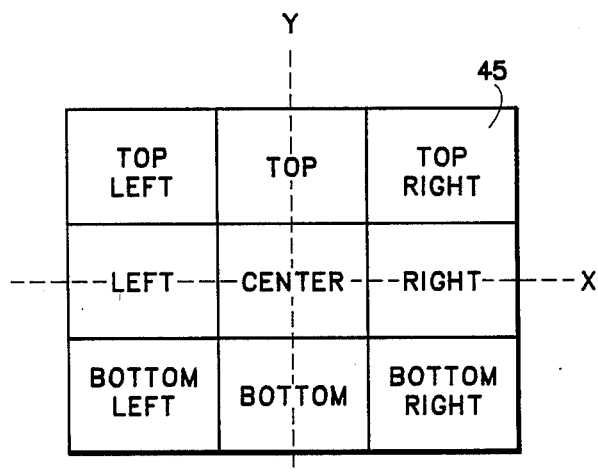
FIG. 4 is a diagram showing the regions of the target surface for which the compensating circuit of FIG. 3 provides independent offset and gain correction.

FIG. 4 shows the division of target surface 45 into a 3×3 array of nine regions, eight of which certain ones of the FET switches address as a function of the position of the writing electron beam. These regions are denominated in FIG. 4 as top left, top, top right, left, center, right, bottom left, bottom and bottom right. The offset and gain of the video signal as the writing electron beam traverses the center region is not controlled by correction signal generator 102 but by the voltage level of the bias signal for the writing beam cathode-ray tube. Table I summarizes the empirically derived combinations of the FET switches providing conductive paths for the $-X^2$, $-Y^2$, and $-X^2Y^2$ signals for each of the eight regions designated in FIG. 4. The entries in Table I for the top, left, right, and bottom regions are the values for the variables when the writing electron beam is on either the X-axis or Y-axis as defined in FIG. 4. The constants $C_{O1}$-$C_{O8}$ and $C_{G1}$-$C_{G8}$ represent the scale factors established by the potentiometers 218 connected to the inputs of amplifiers 226 and 228, respectively. The potentiometers 218 are adjusted to establish the appropriate offset voltage and gain for each of the eight regions that provide spatially uniform transmittance.

TABLE I

| Region | Offset Correction Polynomial | Gain Correction Polynomial |
|---|---|---|
| Top Left | $-(C_{O1}X^2 + C_{O3}X^2Y^2 + C_{O8}Y^2)$ | $-(C_{G1}X^2 + C_{G3}X^2Y^2 + C_{G8}Y^2)$ |

TABLE I-continued

| Region | Offset Correction Polynomial | Gain Correction Polynomial |
| --- | --- | --- |
| Top | $-C_{08}Y^2$ | $-C_{G8}Y^2$ |
| Top Right | $-(C_{02}X^2 + C_{04}X^2Y^2 + C_{08}Y^2)$ | $-(C_{G2}X^2 + C_{G4}X^2Y^2 + C_{G8}Y^2)$ |
| Left | $-C_{01}X^2$ | $-C_{G1}X^2$ |
| Right | $-C_{02}X^2$ | $-C_{G2}X^2$ |
| Bottom Left | $-(C_{01}X^2 + C_{05}X^2Y^2 + C_{07}Y^2)$ | $-(C_{G1}X^2 + C_{G5}X^2Y^2 + C_{G7}Y^2)$ |
| Bottom | $-C_{07}Y^2$ | $-C_{G7}Y^2$ |
| Bottom Right | $-(C_{02}X^2 + C_{06}X^2Y^2 + C_{07}Y^2)$ | $-(C_{G2}X^2 + C_{G6}X^2Y^2 + C_{G7}Y^2)$ |

The gain and offset polynomials corresponding to each of the eight regions set forth in Table I includes the term $(X^2+Y^2+(X^2Y^2))/2$, which is provided on conductor 242 and derived by means of a summing operational amplifier 286. Amplifier 286 receives on its inverting input 288 each of the $-X^2$, $-Y^2$, and $-X^2Y^2$ signals, which are applied to a different one of three 20 kilohm resistors 290. Resistors 290 and a 10 kilohm feedback resistor 292 provide amplifier 286 with a gain of 0.5. A 4.3 kilohm resistor 294 is positioned between ground and the noninverting input 296 of amplifier 286 to minimize the effects of the input offset currents.

The $(X^2+Y^2+(X^2Y^2))/2$ signal permits the output signals of amplifiers 226 and 228 to vary between both positive and negative values independently for each input signal. For the component values given, the gain for each signal could vary approximately from $-1$ to $+1$, depending on the position of the wiper terminal 222 of the corresponding potentiometer 218. This capability for bipolar correction is desirable because certain cathode-ray tubes provide a mirror image of the desired display. This phenomenon is of unknown origin but is constant for a given tube. The capability of inverting each variable in the offset correction and gain correction signals facilitates therefore, the acquisition of the desired image.

It will be obvious to those having skill in the art that many changes may be made in the above-described details of the preferred embodiment of the present invention without departing from the underlying principles thereof. For example, the X and Y signals could be converted to a digital format to provide digital scan position information that would be used to address a read only memory (ROM) that has inscribed therein a map of correction factors for a particular light valve. The data appearing on the outputs of the ROM would be processed by digital-to-analog converters and interpolation filters to form the desired correction signals. The scope of the present invention should be determined, therefore, only by the following claims.

We claim:

1. An electron beam-addressed liquid crystal light modulator having writing and erasing means for emitting a writing beam of primary electrons and an erasing beam of primary electrons that strike a target surface of a liquid crystal cell to cause the emission of secondary electrons from the target surface, the writing beam addressing selected portions of the target surface and the erasing beam erasing previously addressed portions of the target surface, the light modulator comprising:

video signal means developing a video signal for modulating the beam current of the writing beam to address the selected portions of the target surface;

scan position indicating means for indicating the instantaneous scan position of the writing beam on the target surface, the scan position indicating means developing a "X" position signal and a "Y" position signal that indicate the instantaneous scan position of the writing beam; and compensating means cooperating with the scan position indicating means to compensate for spatial variations in writing characteristics of different regions of the target surface, the compensating means comprising plural switches corresponding to different ones of the regions and being actuated at different times to conduct a compensating electrical current whose magnitude varies the magnitude of the video signal, the compensating electrical current including a gain correction signal component proportional to the polynomial $A_1X^2+B_1Y^2+C_1X^2Y^2$ for correcting the gain of the video signal and an offset correction signal component proportional to the polynomial $A_2X^2+B_2Y^2+C_2X^2Y^2$ for correcting the offset of the video signal, where $A_1$, $A_2$, $B_1$, $B_2$, $C_1$, and $C_2$ are constants whose values are adjustable so that polynomials of different values can be derived to correspond to different regions of the target surface, thereby to produce different amounts of beam current in the writing beam in response to its instantaneous scan position on the target surface to provide spatially uniform gray scale luminance across the target surface.

2. The light modulator of claim 1 in which the gain correction means comprises means for selectively providing gain of either positive or negative polarity.

* * * * *